Dec. 31, 1935.  S. B. COLGATE  2,026,376
APPARATUS FOR COPYING GOFFERED FILMS
Filed Dec. 26, 1931
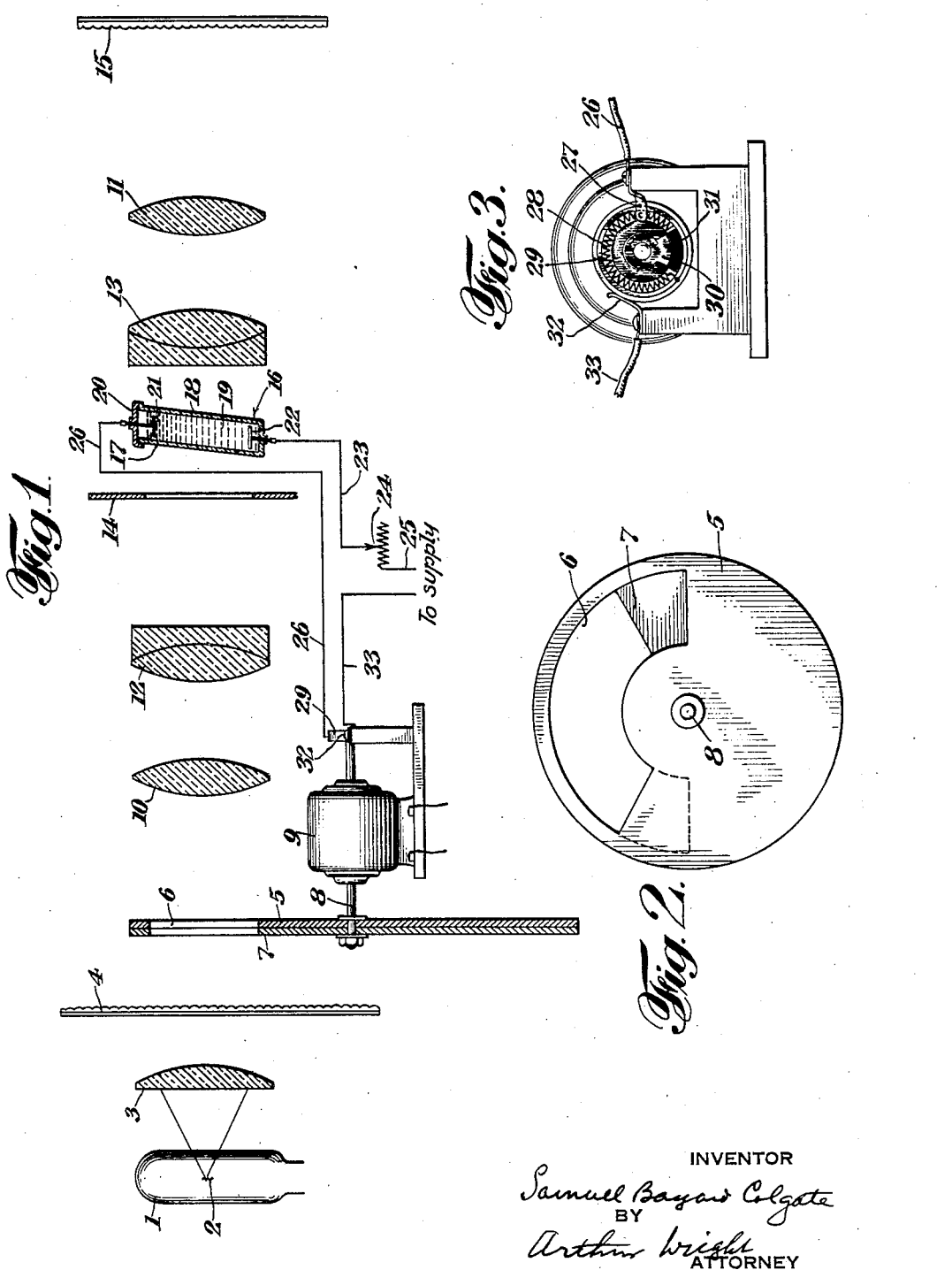
INVENTOR
Samuel Bayard Colgate
BY
Arthur Wright
ATTORNEY Patented Dec. 31, 1935

2,026,376

UNITED STATES PATENT OFFICE 2,026,376

APPARATUS FOR COPYING GOFFERED FILMS

Samuel Bayard Colgate, Orange, N. J., assignor to Keller-Dorian Colorfilm Corporation, New York, N. Y., a corporation of Delaware Application December 26, 1931, Serial No. 583,226

12 Claims. (Cl. 88—24)

My invention relates to an improved apparatus for eliminating moiré effects in copying goffered films.

The object of my invention is to provide an apparatus by means of which lenticulated films as, for example, films having linear lenticulations thereon, may be copied without producing on the copy undesirable light effects due to lack of registry between the two films. The object of my invention is, furthermore, especially to provide a mechanism for this purpose which may remain fixed without requiring movement during the copying. Another object is to carry out the copying in such a manner as to permit the adjustment thereof to a very fine degree so as to completely eliminate the moiré effects and so as to enable this end to be accomplished even with films having different sizes of gofferings, without necessitating the replacement of the apparatus used for removing the moiré effects. Further objects of my invention will be apparent from the detailed description of the same hereinafter.

While my invention may be embodied in many different forms, by way of illustration I have shown only one form of my invention in the accompanying drawing, in which—

Fig. 1 is a diagrammatic elevation of an apparatus which may be used in accordance with my invention;

Fig. 2 is an elevation of the shutter used; and

Fig. 3 is an elevation of the circuit-breaker mechanism.

In the drawing, I have shown a source of light I which may be an incandescent bulb, having a rectilinear filament 2 from which the light passes through a collimating lens 3 adapted to transmit parallel rays of light through a goffered film 4 carrying the images thereon for producing cinematographic pictures. This film may be made, for example, with a celluloid support carrying impressed on one face a series of transverse cylindrical lenticulations of approximately 1/20 mm. in width, and which is known as a Keller-Dorian film. The light from this point passes through a shutter 5 having an opening 6 for the passage of the light, the size of which can be adjusted in a rotary direction by means of a movable portion 7 carried on the same axis with the shutter. The said shutter is carried on a shaft 8 of a constant speed electric motor 9 driven from any suitable source of power at such a speed as to cut off the light between the periods during which the successive images are being copied. The light from the film 4, after passing through the shutter 5, is transmitted through an optical system of any desired type but such, for example, as that shown in original Fig. 4 of the French patent of Andre Oswald No. 605,875, filed February 7, 1925. This objective system is comprised of two bi-convex lenses 10 and 11 and two plano-convex lenses 12 and 13, having located between the latter two lenses a diaphragm 14. The film 4 is in the focal plane of the objective comprising the lenses 10 and 12 and a film 15 from which the copy is to be made, is in the focal plane of the objective comprised of the lenses 11 and 13. Both of said objectives preferably have a long focus to decrease cat's eye and Petzwal curve effects. Also, the diaphragm 14 is in a position between both of said objectives midway between the same. Accordingly the rays of light passing between the said two objectives are parallel. It will of course be understood that the lens system referred to is constructed so as to be corrected in the usual way for achromatism, spherical aberration and astigmatism. At one side of the diaphragm 14 there is located in such a manner as to cover the diaphragm opening, a cell 16 comprised of transparent glass having parallel sides 17 and 18, both of which are inclined towards the axis of the rays passing through the lens system. There is accordingly provided within the cell 16 a chamber 19, provided with a vapor-tight safety escape removable cover 20, containing a light refracting substance as, for example, carbon bisulfide or other suitable liquid, having two electrodes 21 and 22 contained in the upper and lower portions respectively of the body of liquid therein. The electrode 22 is connected by a lead 23 to a manually operable rheostat 24 which is connected by a lead 25 to any suitable source of power as, for example, a source of current of a suitable voltage, although a high or low voltage may be used as desired. The electrode 21 is connected by a lead 26 to a brush 27 cooperating with a rotary variable resistance 28, one terminal of which is connected to a conducting sleeve 29 supported by an insulating core 30 on the shaft 8. The sleeve 29 also has an insulating portion 31 in the path of the brush 27. There is also provided a brush 32 which is connected by a lead 33 to the said source of power.

In carrying out my invention, the film 4, carrying the succession of images, is passed through the apparatus with the aid of the usual cinematographic stop-feed mechanism and during the periods of rest the shutter 5 will be in such a position that its opening 6 permits the transmission of light through the lens system, as well as the cell containing carbon bisulfide, and thence onto the new goffered film 15 which is also driven by a stop-feed mechanism of the usual type in unison with the film 4. It will of course be understood that, due to the conformation of the cylindrical lenticles on the film 4, owing to the fact that the images on the film 4 have been taken by the Keller-Dorian method with the usual three-color filter having the zones of color, red, green and blue, parallel to the lenticulations, the light from the film 4 corresponding to the three color zones referred to, will pass through the usual three color zones in the lens system until they reach the film 15, although, of course, no color filter is necessary in carrying out the copying operation. During the passage of the light in this manner through the lens system, the light will be caused to pass through the cell 16 containing carbon bisulfide, where it will be refracted and bent due to the inclination of the said cell to the axis of the light rays. During the exposure of each particular image through the shutter 5, however, an uniformly increasing potential will be applied between the electrodes 21 and 22 with the aid of the variable resistance and circuit breaker, so that, as a result, the carbon bisulfide within the chamber 19 will be put under a strain, thereby changing its index of refraction and, accordingly, moving the rays of light during the period of each exposure of each of the images through the opening 6 in the shutter 5. This movement of the rays during exposure will be such that during each exposure of each of the images the rays of light will be moved at the film 15 a definite distance of from ½ to 1½ of a width of a lenticle but which may be changed at will. The inclination of the cell 16 and the voltage of the current supplied to the electrodes therein will be so adjusted and the rheostat 24 moved accordingly, in order to secure the desired range of movement of the rays on the film 15 during the copying of the image. Where the gofferings are from 15 to 20 to the millimeter there will be a movement of the rays, accordingly, during the copying of each image of from ½ to 1½ the width of each of these lenticles. After the film 15 has been exposed in this manner it may be developed and inverted in the usual way or completed in any manner desired.

While I have described my invention above in detail I wish it to be understood that many changes may be made therein without departing from the spirit of the same.

I claim:

1. An apparatus of the character described, the combination of a goffered film carrying an image to be copied, a source of light and a lens system through which the light is passed from the film, a body of material having a variable index of refraction located on the optical axis of the lens system and inclined thereto, a goffered film on which the light is adapted to be received and means for progressively and continuously varying the said index of refraction during the exposure so as to displace the light from ½ to 1½ lines of goffering.

2. An apparatus of the character described, the combination of a goffered film carrying an image to be copied, a source of light and a lens system through which the light is passed from the film, a body of material having a variable index of refraction located on the optical axis of the lens system and inclined thereto, a goffered film on which the light is adapted to be received and electrical means for progressively and continuously varying the said index of refraction during the exposure so as to displace the light from ½ to 1½ lines of goffering.

3. An apparatus of the character described, the combination of a goffered film carrying an image to be copied, a source of light and a lens system through which the light is passed from the film, a body of carbon disulfide as a material having a variable index of refraction located on the optical axis of the lens system and inclined thereto, a goffered film on which the light is adapted to be received and means for progressively and continuously varying the said index of refraction during the exposure so as to displace the light from ½ to 1½ lines of goffering.

4. An apparatus of the character described, the combination of a goffered film carrying an image to be copied, a source of light and a lens system through which the light is passed from the film, a body of carbon disulfide as a material having a variable index of refraction located on the optical axis of the lens system and inclined thereto, a goffered film on which the light is adapted to be received and electrical means for progressively and continuously varying the said index of refraction during the exposure so as to displace the light from ½ to 1½ lines of goffering.

5. An apparatus of the character described, the combination of a goffered film carrying an image to be copied, a source of light and a lens system through which the light is passed from the film, a body of carbon disulfide as a material having a variable index of refraction located on the optical axis of the lens system in a chamber inclined towards the optical axis, a goffered film on which the light is adapted to be received and means for progressively and continuously varying the said index of refraction during the exposure so as to displace the light from ½ to 1½ lines of goffering.

6. An apparatus of the character described, the combination of a goffered film carrying an image to be copied, a source of light and a lens system through which the light is passed from the film, a body of carbon disulfide as a material having a variable index of refraction located on the optical axis of the lens system in a chamber inclined towards the optical axis, a goffered film on which the light is adapted to be received and electrical means for progressively and continuously varying the said index of refraction during the exposure so as to displace the light from ½ to 1½ lines of goffering.

7. An apparatus of the character described, the combination of a goffered film carrying an image to be copied, a source of light and a lens system through which the light is passed from the film, a body of material having a variable index of refraction located on the optical axis of the lens system and inclined thereto, a goffered film on which the light is adapted to be received, electrical means for varying the said index of refraction during the exposure so as to displace the light from ½ to 1½ lines of goffering, a shutter and a circuit breaker connected for operation with said shutter and adapted to complete and interrupt the circuit in the said electrical means while the image is being exposed 8. An apparatus of the character described, the combination of a goffered film carrying an image to be copied, a source of light and a lens system through which the light is passed from the film, a body of carbon disulfide as a material having a variable index of refraction located on the optical axis of the lens system, and inclined thereto, a goffered film on which the light is adapted to be received, electrical means for varying the said index of refraction during the exposure so as to displace the light from ½ to 1½ lines of goffering, a shutter and a circuit breaker connected for operation with said shutter and adapted to complete and interrupt the circuit in the said electrical means while the image is being exposed.

9. An apparatus of the character described, the combination of a goffered film carrying an image to be copied, a source of light and a lens system through which the light is passed from the film, a body of carbon disulfide as a material having a variable index of refraction located on the optical axis of the lens system in a chamber inclined towards the optical axis, a goffered film on which the light is adapted to be received, electrical means for varying the said index of refraction during the exposure so as to displace the light from ½ to 1½ lines of goffering, a shutter and a circuit breaker connected for operation with said shutter and adapted to complete and interrupt the circuit in the said electrical means while the image is being exposed.

10. An apparatus of the character described, the combination of a goffered film carrying an image to be copied, a source of light and a lens system through which the light is passed from the film, a body of material having a variable index of refraction located on the optical axis of the lens system and inclined thereto, a goffered film on which the light is adapted to be received and electrical means for progressively and continuously varying the said index of refraction during the exposure so as to displace the light from ½ to 1½ lines of goffering, said electrical means comprising electrodes in said material and a rheostat for adjusting the potential between the said electrodes.

11. An apparatus of the character described, the combination of a goffered film carrying an image to be copied, a source of light and a lens system through which the light is passed from the film, a body of carbon disulfide as a material having a variable index of refraction located on the optical axis of the lens system and inclined thereto, a goffered film on which the light is adapted to be received and electrical means for progressively and continuously varying the said index of refraction during the exposure so as to displace the light from ½ to 1½ lines of goffering, said electrical means comprising electrodes in said material and a rheostat for adjusting the potential between said electrodes.

12. An apparatus of the character described, the combination of a goffered film carrying an image to be copied, a source of light and a lens system through which the light is passed from the film, a body of carbon disulfide as a material having a variable index of refraction located on the optical axis of the lens system in a chamber inclined towards the optical axis, a goffered film on which the light is adapted to be received and electrical means for progressively and continuously varying the said index of refraction during the exposure so as to displace the light from ½ to 1½ lines of goffering, said electrical means comprising electrodes in said material and a rheostat for adjusting the potential between said electrodes.

SAMUEL BAYARD COLGATE.